(12) United States Patent
Kurita et al.

(10) Patent No.: US 10,429,598 B2
(45) Date of Patent: Oct. 1, 2019

(54) OPTICAL DEVICE AND OPTICAL COUPLING MODULE

(71) Applicant: KABUSHIKI KAISHA TOSHIBA, Minato-ku, Tokyo (JP)

(72) Inventors: Yoichiro Kurita, Tokyo (JP); Hideto Furuyama, Kanagawa (JP); Hiroshi Uemura, Kanagawa (JP); Fumitaka Ishibashi, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/265,093

(22) Filed: Sep. 14, 2016

(65) Prior Publication Data

US 2017/0153401 A1     Jun. 1, 2017

(30) Foreign Application Priority Data

Nov. 30, 2015   (JP) .................... 2015-234100

(51) Int. Cl.

| | | |
|---|---|---|
| *G02B 6/42* | (2006.01) | |
| *G02B 6/13* | (2006.01) | |
| *G02B 6/32* | (2006.01) | |
| *G02B 6/34* | (2006.01) | |
| *G02B 6/36* | (2006.01) | |

(52) U.S. Cl.
CPC ........... *G02B 6/4243* (2013.01); *G02B 6/131* (2013.01); *G02B 6/32* (2013.01); *G02B 6/4204* (2013.01); *G02B 6/425* (2013.01); *G02B 6/34* (2013.01); *G02B 6/3644* (2013.01); *G02B 6/4214* (2013.01); *G02B 6/4239* (2013.01)

(58) Field of Classification Search
CPC .......... G02B 6/43; G02B 6/4243; G02B 6/32; G02B 6/34; G02B 6/425; G02B 6/131
See application file for complete search history.

(56) References Cited

U.S. PATENT DOCUMENTS

| | | |
|---|---|---|
| 4,995,695 A | 2/1991 | Pimpinella et al. |
| 6,023,546 A | 2/2000 | Tachigori |
| 2003/0142909 A1 | 7/2003 | Suzuki et al. |
| 2004/0134416 A1 | 7/2004 | Furuyama |
| 2015/0030338 A1 | 1/2015 | Miyazaki et al. |

FOREIGN PATENT DOCUMENTS

| | | |
|---|---|---|
| JP | H395510 A | 4/1991 |
| JP | H05-129638 | 5/1993 |
| JP | H06-232455 | 8/1994 |
| JP | H09-73028 A | 3/1997 |
| JP | H11-23914 A | 1/1999 |
| JP | 11-211942 A | 8/1999 |
| JP | 2003-215388 A | 7/2003 |
| JP | 3723177 B2 | 12/2005 |
| JP | 2010-286549 A | 12/2010 |
| JP | 2015-022247 A | 2/2015 |

OTHER PUBLICATIONS

English Machine Translation of JP11-211942A.*

* cited by examiner

*Primary Examiner* — John Bedtelyon
(74) *Attorney, Agent, or Firm* — Foley & Lardner LLP

(57) ABSTRACT

According to one embodiment, an optical device includes an optical element and a via. The optical element is provided directly on a second main surface opposed to a first main surface of a semiconductor substrate. The via is aligned with the optical element and formed to extend halfway in a thickness direction from the first main surface of the semiconductor substrate.

30 Claims, 14 Drawing Sheets

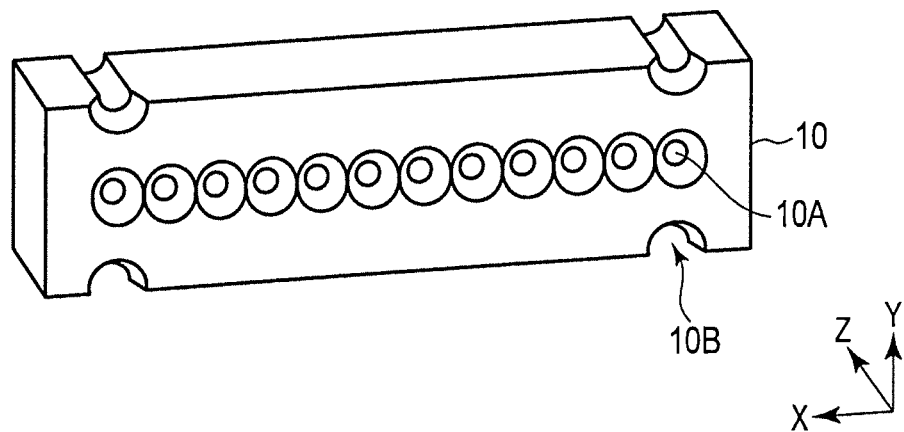
F I G. 1A
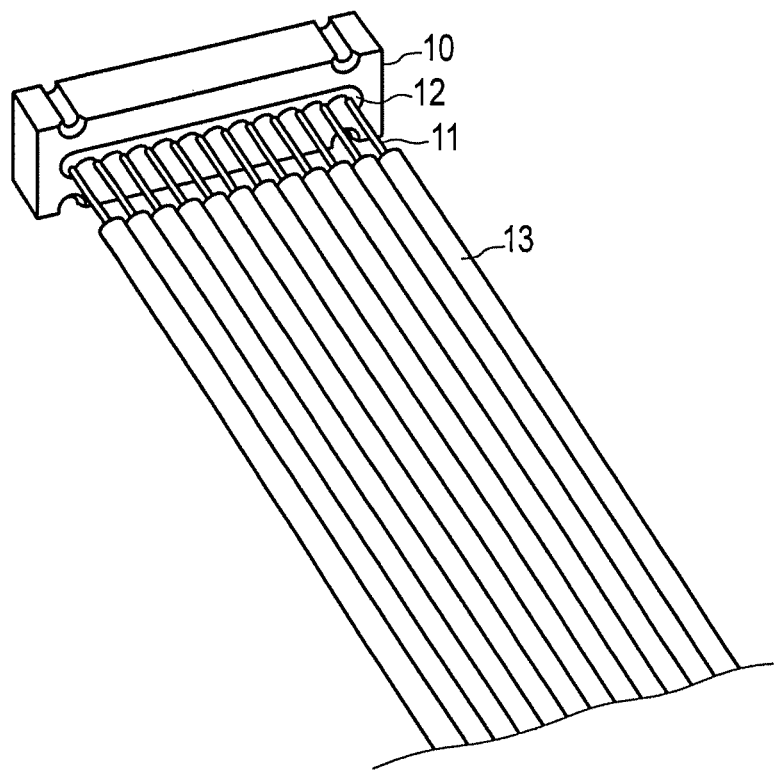
F I G. 1B

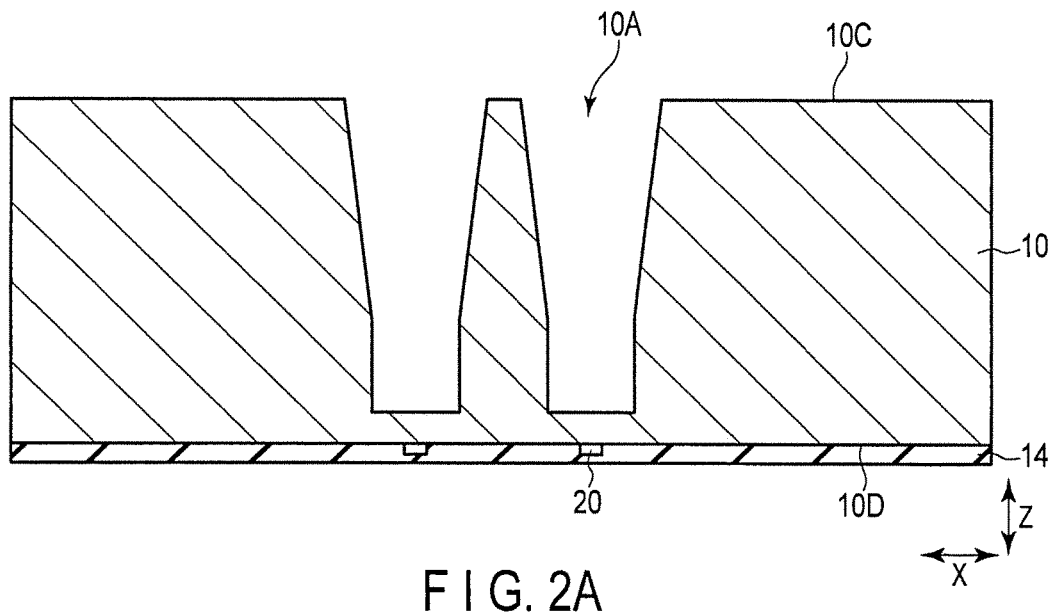
F I G. 2A
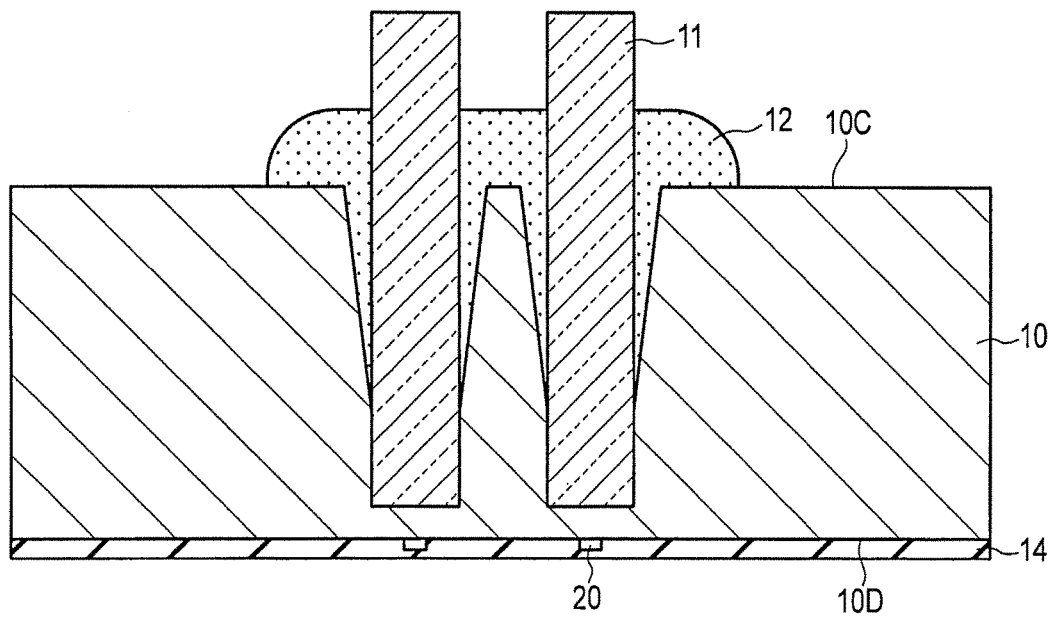
F I G. 2B

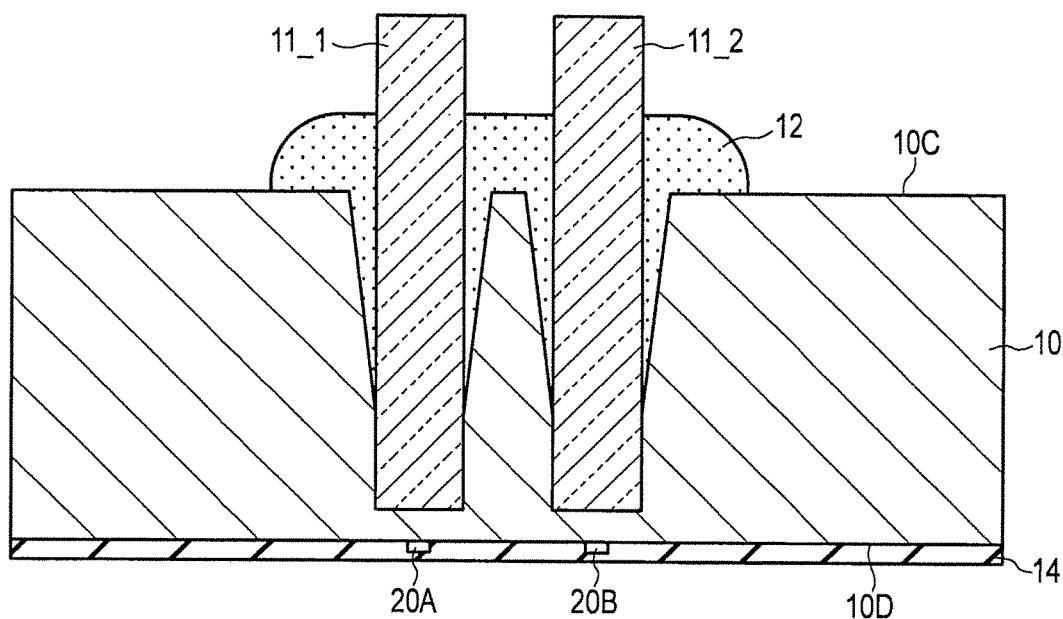
F I G. 3
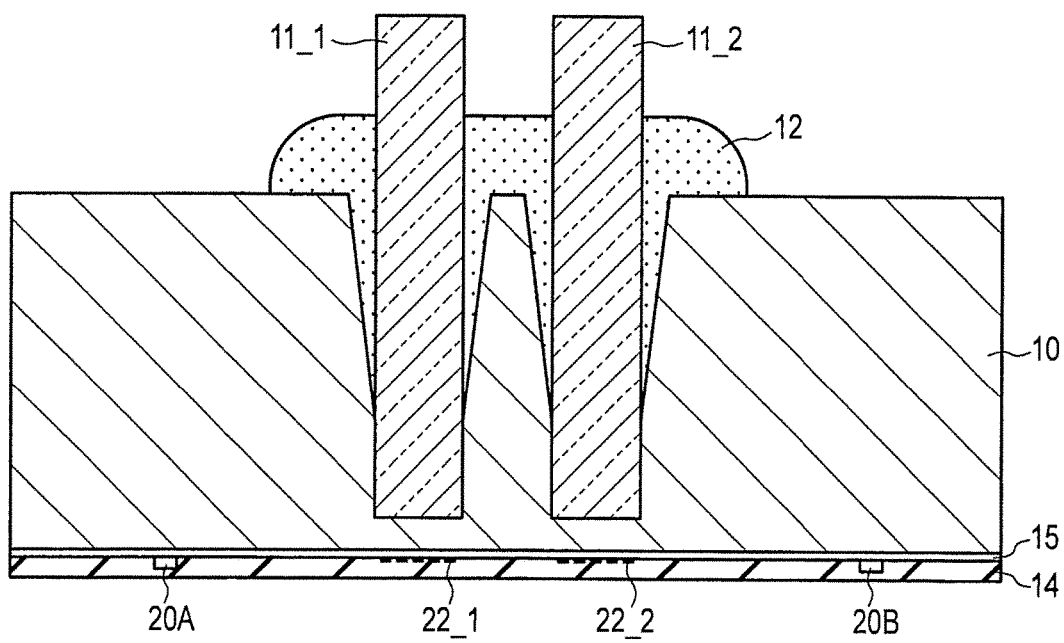
F I G. 4

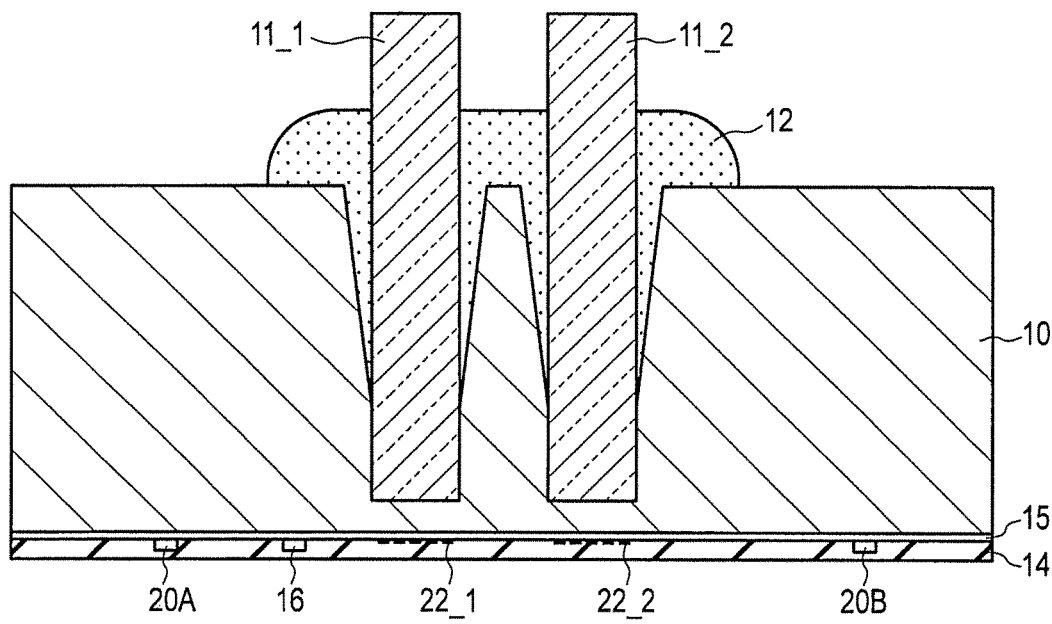
F I G. 5
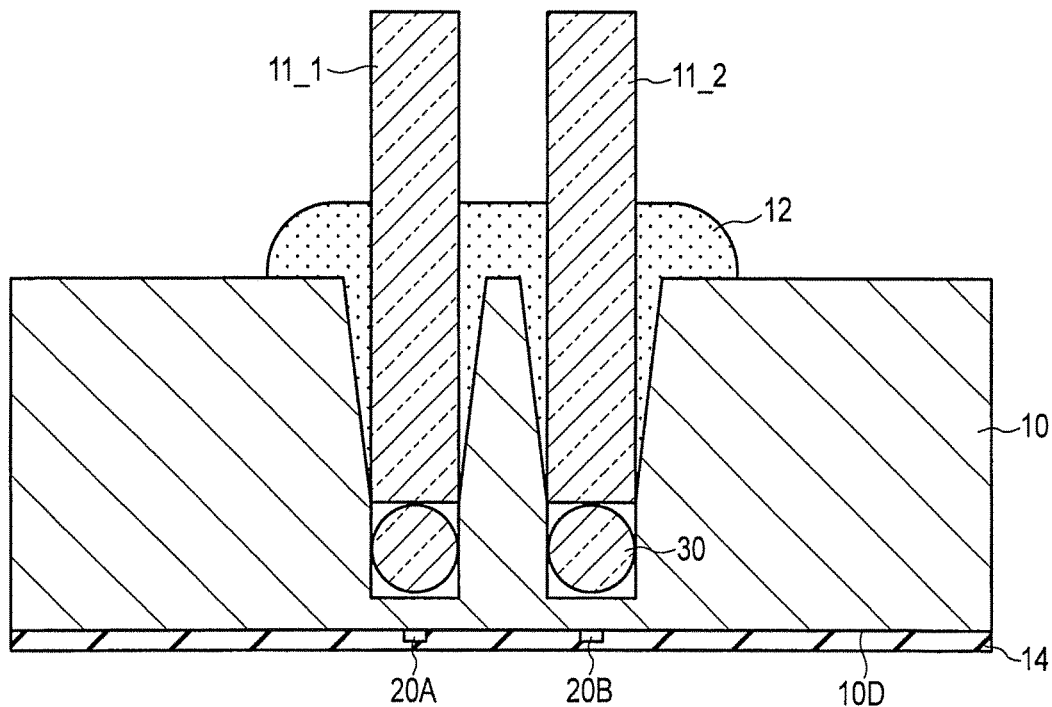
F I G. 6

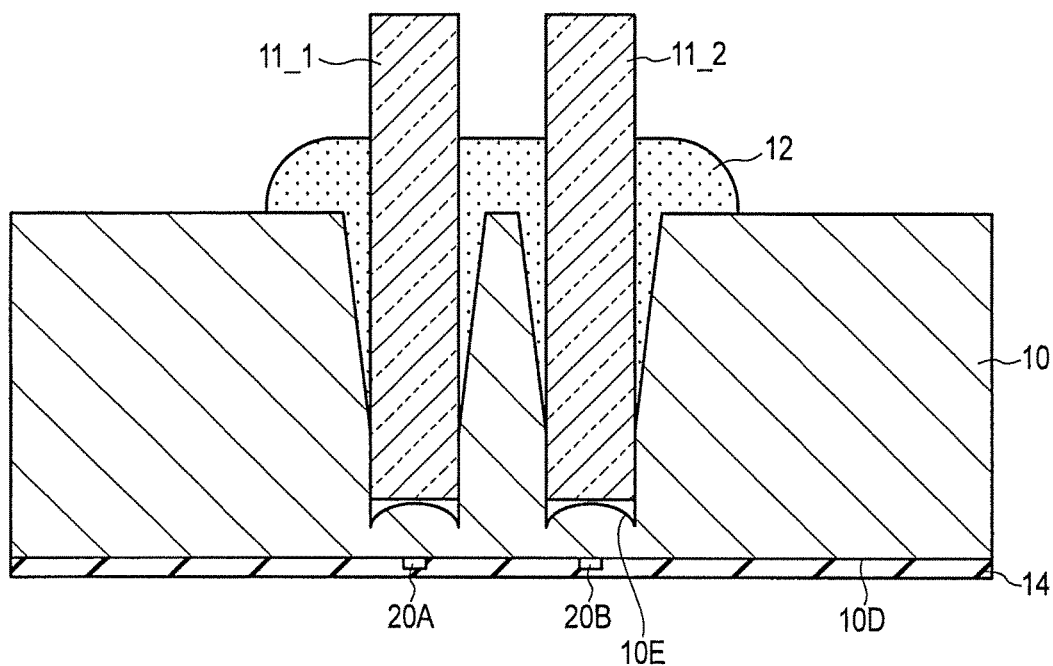
F I G. 9
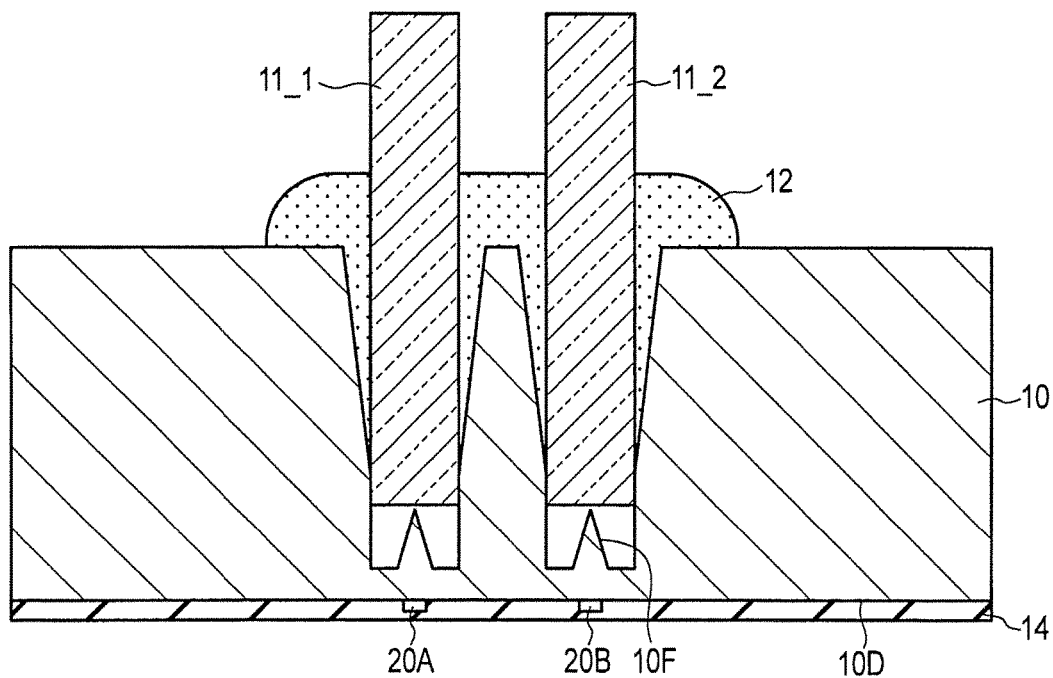
F I G. 10

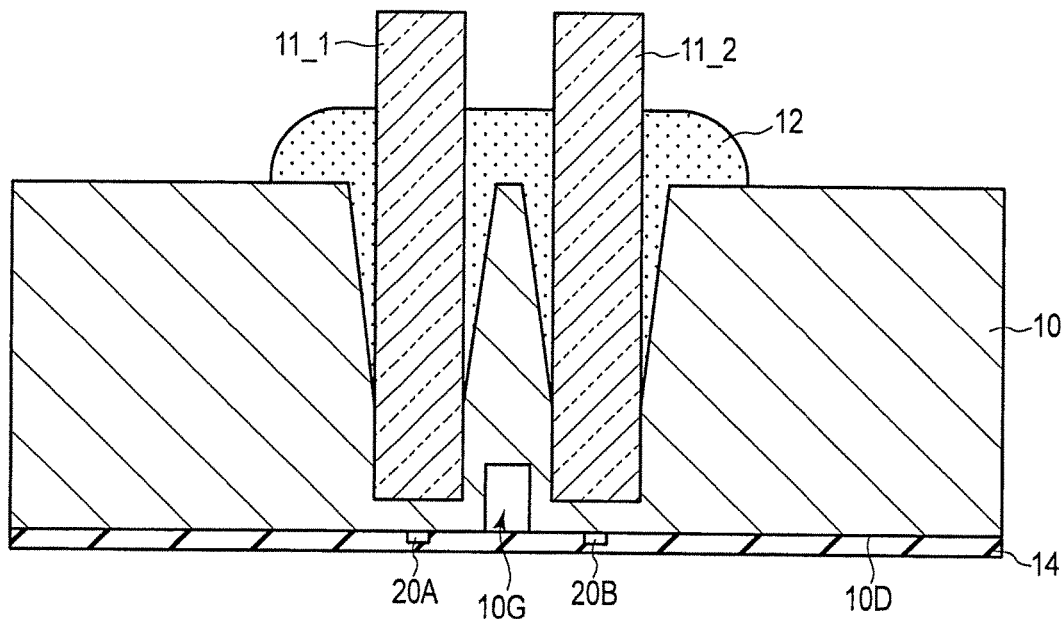
F I G. 11A
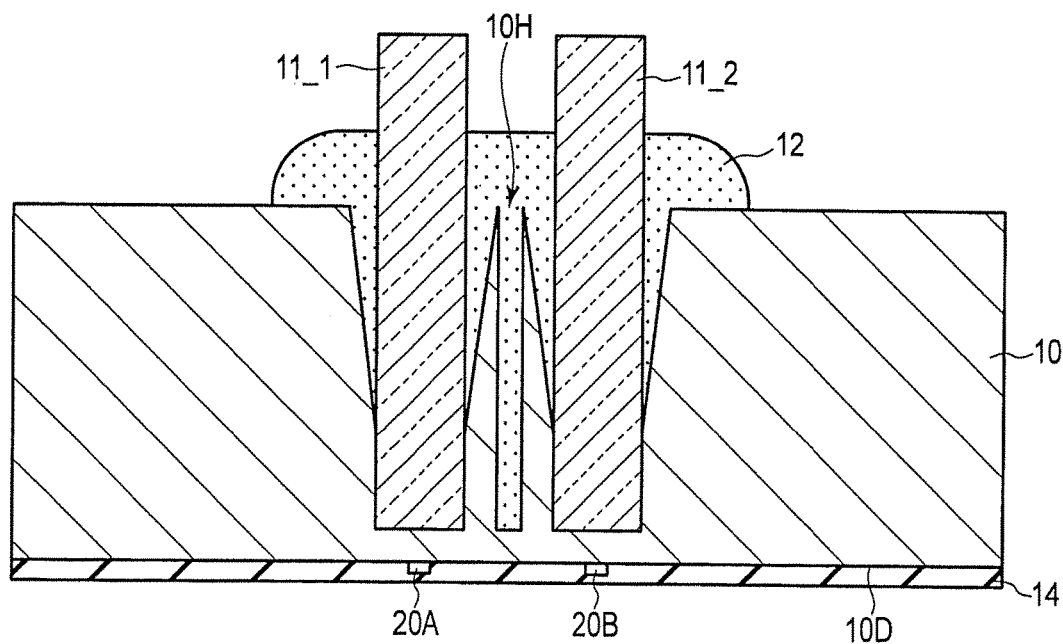
F I G. 11B

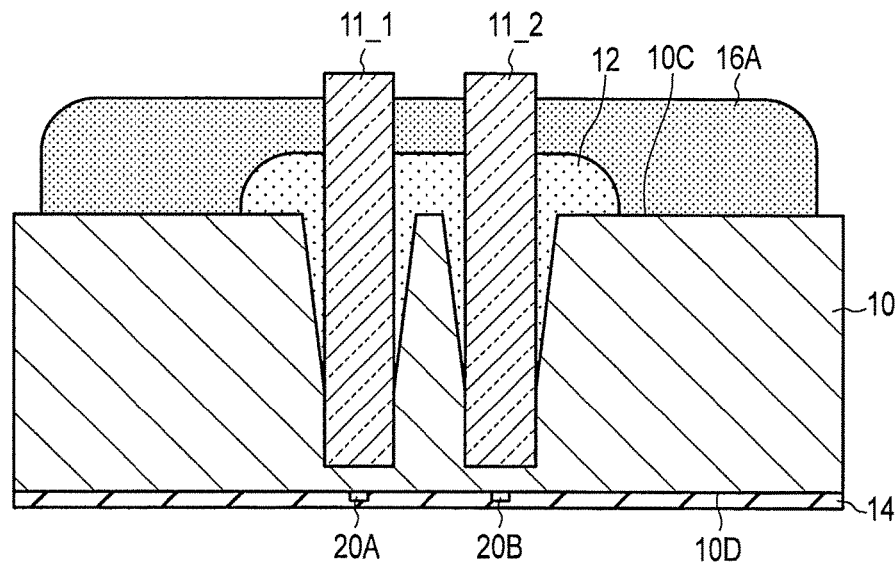
F I G. 12A
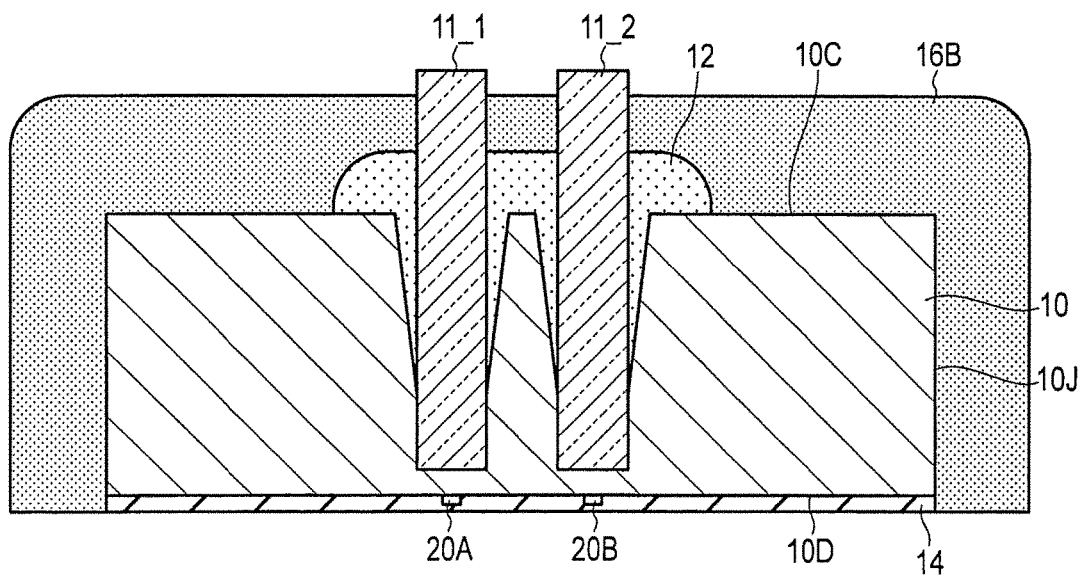
F I G. 12B

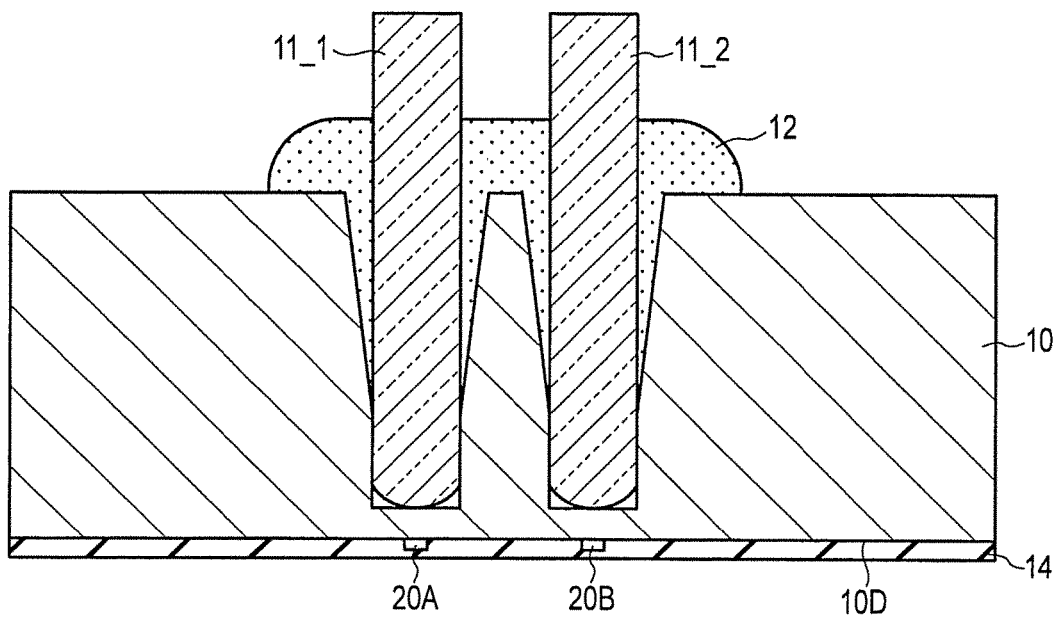
F I G. 14
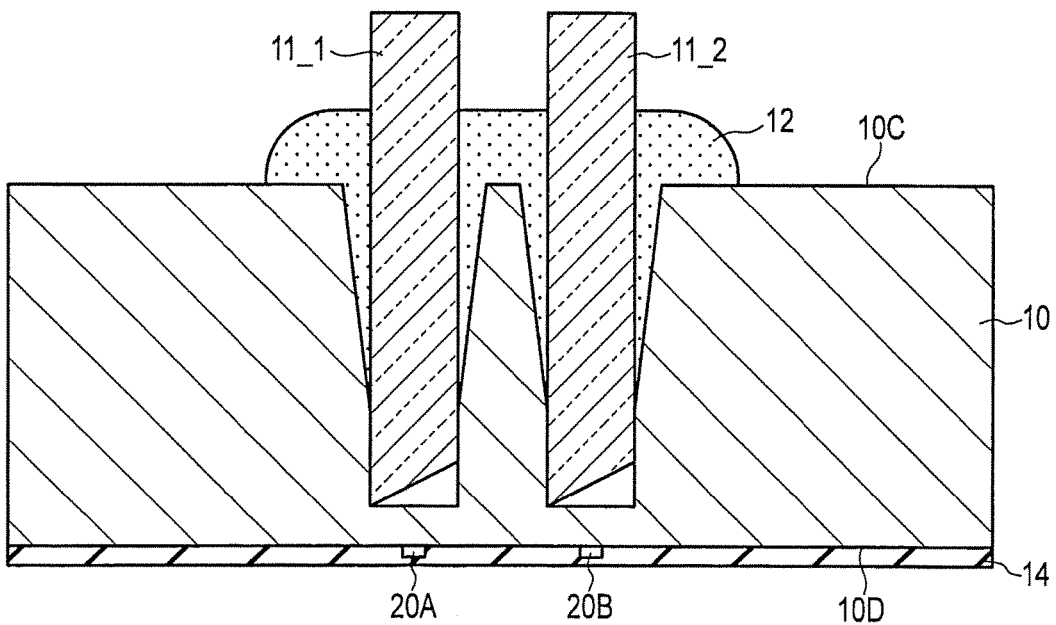
F I G. 15

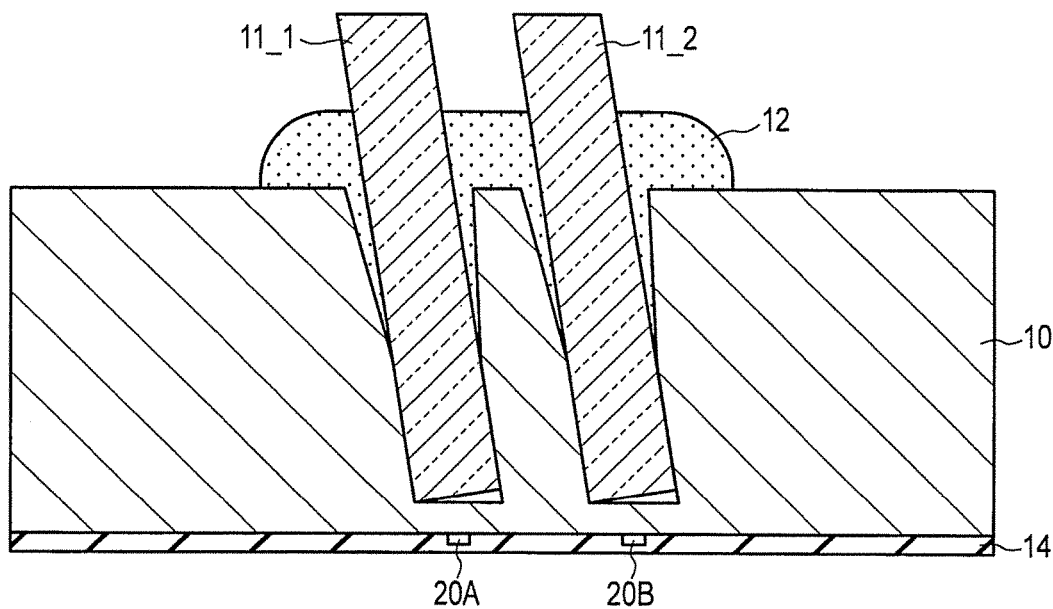
F I G. 16
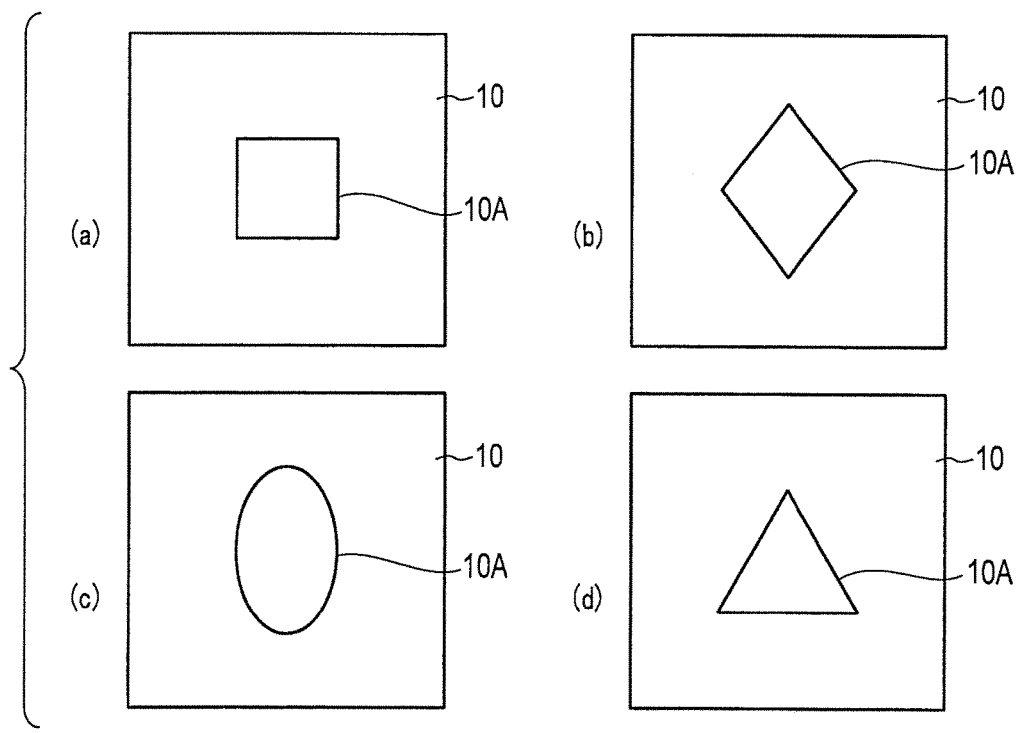
F I G. 17

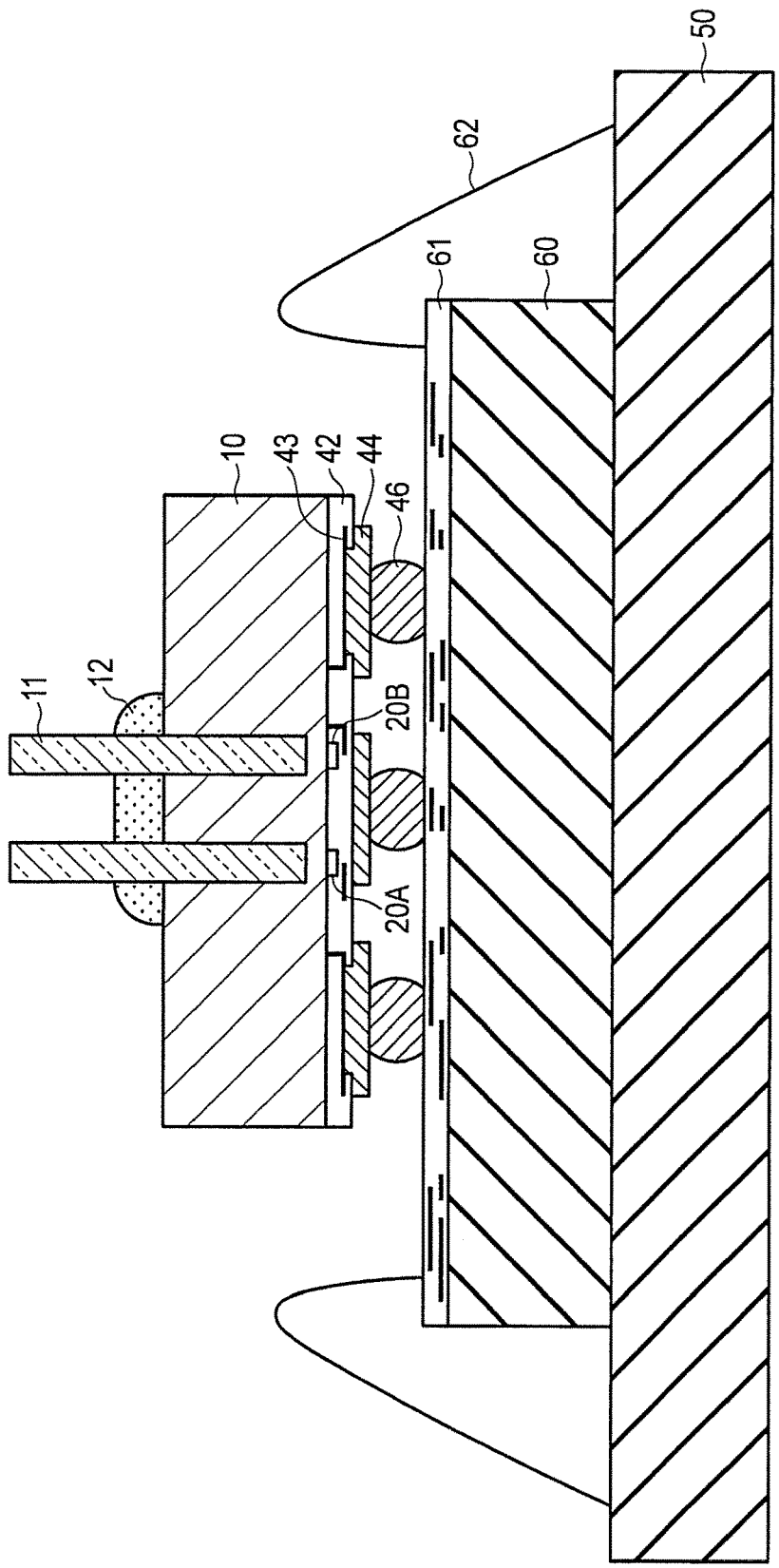
F I G. 19

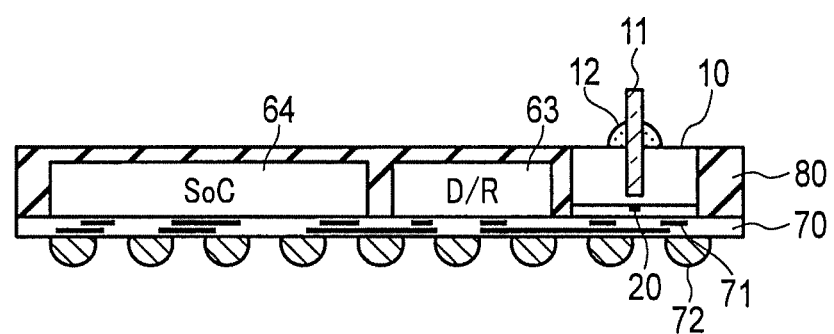
F I G. 20
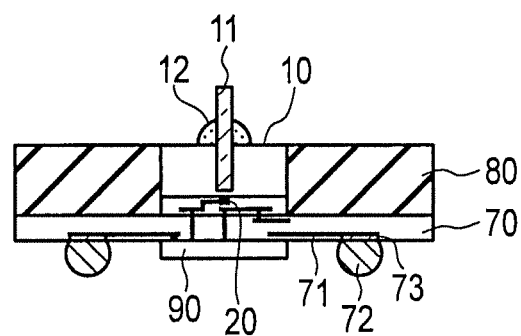
F I G. 21

OPTICAL DEVICE AND OPTICAL COUPLING MODULE

CROSS-REFERENCE TO RELATED APPLICATIONS

This application is based upon and claims the benefit of priority from Japanese Patent Application No. 2015-234100, filed Nov. 30, 2015, the entire contents of which are incorporated herein by reference.

FIELD

Embodiments described herein relate generally to an optical device having a light-emitting or light-receiving function, and an optical coupling module having the optical device and optical fibers which are optically coupled to the optical device.

BACKGROUND

In optical communications using optical fibers, a light-emitting/light-receiving module (referred to as an optical coupling module hereinafter) is employed in which the optical fibers are optically coupled to optical elements (light-emitting elements or light-receiving elements).

BRIEF DESCRIPTION OF THE DRAWING

FIGS. 1A and 1B are perspective views showing configurations of an optical device and an optical coupling module according to a first embodiment.

FIGS. 2A and 2B are cross-sectional views showing configurations (1) of an optical device and an optical coupling module according to the first embodiment.

FIG. 3 is a cross-sectional view showing another example of the configuration (1) of the optical coupling module according to the first embodiment.

FIG. 4 is a cross-sectional view showing a configuration (2) of an optical coupling module according to the first embodiment.

FIG. 5 is a cross-sectional view showing a configuration (3) of an optical coupling module according to the first embodiment.

FIG. 6 is a cross-sectional view showing a configuration (4) of an optical coupling module according to the first embodiment.

FIG. 9 is a cross-sectional view showing a configuration (7) of an optical coupling module according to the first embodiment.

FIG. 10 is a cross-sectional view showing a configuration (8) of an optical coupling module according to the first embodiment.

FIGS. 11A and 11B are cross-sectional views showing configurations (9) of optical coupling modules according to the first embodiment.

FIGS. 12A and 12B are cross-sectional views showing configurations (10) of optical coupling modules according to the first embodiment.

FIGS. 14, 15 and 16 are cross-sectional views of blind vias in optical coupling modules according to the first embodiment.

FIG. 17 is plan views showing shapes of the blind vias in the optical coupling module according to the first embodiment.

FIG. 19 is an illustration of an optical coupling module device (2) according to the second embodiment.

FIG. 20 is an illustration of an optical coupling module device (3) according to the second embodiment.

FIG. 21 is an illustration of an optical coupling module device (4) according to the second embodiment.

DETAILED DESCRIPTION

Figure 7:
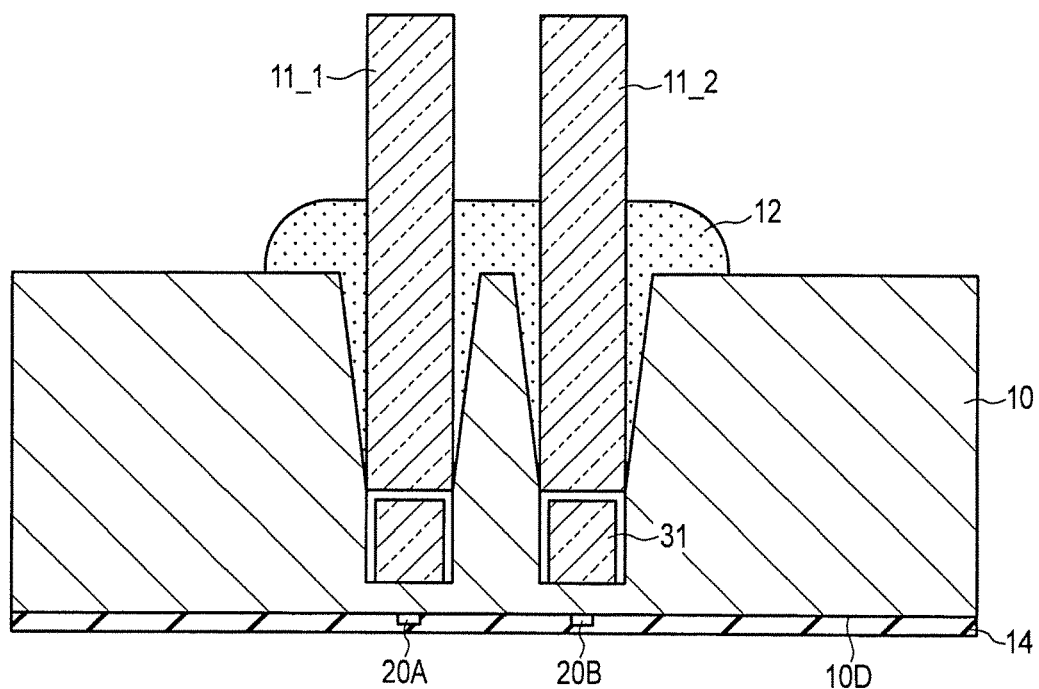
FIG. 7 is a cross-sectional view showing a configuration (5) of an optical coupling module according to the first embodiment.

Embodiments will be described below with reference to the accompanying drawings. In the following descriptions, components having like functions and like configurations are given like reference numerals.

In general, according to one embodiment, an optical device includes an optical element and a via. The optical element is provided directly on a second main surface opposed to a first main surface of a semiconductor substrate. The via is aligned with the optical element and formed to extend halfway in a thickness direction from the first main surface of the semiconductor substrate.

[1] First Embodiment

Configurations of an optical device and an optical coupling module according to a first embodiment will be described.

[1-1] Configurations of Optical Device and Optical Coupling Module

FIG. 1A is a perspective view showing a configuration of an optical device according to the first embodiment. FIG. 1B is a perspective view showing an optical coupling module in which optical fibers are inserted into the optical device.

As shown in FIG. 1A, the optical device includes a semiconductor substrate, e.g. a silicon substrate 10. One or more optical elements (light-emitting elements, light-receiving elements, diffraction gratings or the like), which are not shown, are formed on one surface of the silicon substrate 10, and blind vias (or fiber sockets) 10A are formed on the other surface of the silicon substrate 10 in alignment with the portions (which correspond to light-emitting or light-receiving portions if the optical elements are light-emitting or light-receiving elements) through which light of the optical elements passes. Through vias 10B are formed close to their respective corners of the silicon substrate 10. For example, the through vias 10B can be used to fix the optical device. The optical elements are not limited to elements for converting electrical signals into optical signals or elements for converting optical signals into electrical signals, such as the light-emitting elements and light-receiving elements, but include an element that changes a light traveling direction or an element that reflects light.

In the first embodiment, an XYZ orthogonal coordinate system is introduced for convenience of descriptions. In this coordinate system, two directions which are parallel to the main surface of the silicon substrate 10 and orthogonal to each other are defined as X and Y directions, and a direction which is orthogonal to both the X and Y directions is defined as a Z direction.

The outside dimensions of the optical device are, for example, 3.5 mm in the direction (X direction) in which the blind vias 10A are arranged, 1 mm in the direction (Y direction) which is orthogonal to the X direction of the blind vias 10A, and 0.73 mm in the depth direction (Z direction) of the blind vias 10A.

As shown in FIG. 1B, the optical coupling module is so configured that optical fibers 11 are inserted into the blind vias 10A of the foregoing optical device and the optical fibers 11 are fixed to the silicon substrate 10 by a transparent resin 12 or the like. Covering sections 13 are provided to cover the optical fibers 11. The blind vias 10A, optical fibers 11 and optical elements will be described in detail later.

In the first embodiment, silicon is used as the semiconductor substrate; however, an element other than silicon can be used as the semiconductor substrate.

[1-1-1] Configuration Examples (1) of Optical Device and Optical Coupling Module An optical coupling structure including the blind vias 10A, optical fibers 11 and optical elements in the optical device and the optical coupling module will be described in detail.

FIG. 2A is a cross-sectional view of blind vias of the optical device shown in FIG. 1A. The number of blind vias 10A shown in the following cross-sectional views including FIG. 2A is two; however, it may be one or three or more.

As shown in FIG. 2A, blind vias 10A are formed in the silicon substrate 10. The blind vias 10A are formed to extend halfway in the thickness direction (Z direction) of the silicon substrate 10 and does not go through the silicon substrate 10. More specifically, if the silicon substrate 10 has a first main surface 10C and a second main surface 10D opposed to the first main surface, the blind vias 10A extend halfway in the thickness direction from the first main surface 10C and does not reach the second main surface 10D. The distance between the bottom of each of the blind vias 10A and the second main surface 10D is, for example, 20 µm through 40 µm.

On the second main surface 10D of the silicon substrate 10, optical elements (light-emitting elements or light-receiving elements) 20 are formed. The blind vias 10A are formed in alignment with light-emitting sections or light-receiving sections of the optical elements 20. More specifically, the blind vias 10A are formed such that the light-emitting sections or light-receiving sections of the optical elements 20 are located on the optical axes of the optical fibers 11 described later to allow the optical elements 20 and the optical fibers 11 to be optically coupled to each other.

Structures and materials to operate the optical elements 20 at a wavelength that makes the semiconductor substrate transparent are used for the optical elements 20. If the semiconductor substrate is the silicon substrate 10, the emission wavelength of the light-emitting elements is longer than, e.g. 1.3 µm, and the light-emitting elements are formed by, e.g. GaInAsP and AlInGaAs materials that are lattice-matched with an InP substrate. The light-receiving elements are formed by materials capable of receiving light at the emission wavelength of the light-emitting elements, and, for example, InGaAs that is lattice-matched with an InP substrate is formed as a light absorption layer.

The optical elements 20 can be manufactured by the method disclosed in, e.g. Japanese Patent No. 3723177. It is desirable to form the optical elements 20 with the silicon substrate 10 flatted and it is also desirable to form them before the blind vias 10A. However, the optical elements 20 can be formed after the blind vias 10A. Either will do if the light-emitting and light-receiving sections of the optical elements 20 are so aligned that they are optically coupled to the optical fibers 11.

The optical elements 20 are made of compound semiconductor (e.g. III-V group semiconductor) materials and include a crystal growth layer that is formed by crystallizing and growing the compound semiconductor materials on a compound semiconductor substrate other than the silicon substrate (semiconductor substrate) 10. The compound semiconductor materials can be stuck on the second main surface of the silicon substrate 10 to form an optical element active section.

The optical elements 20 can be provided directly on the second main surface 10D of the silicon substrate 10. The "provided directly" includes a case where the optical elements 20 are not mounted via bumps or the like but provided directly by sticking a compound semiconductor material other than the silicon substrate 10 onto the second surface of the silicon substrate 10 and a case where the optical elements 20 are crystallized and grown on (formed integrally with) the second main surface of the silicon substrate 10.

Furthermore, some of the functional structures of the optical elements 20 can be provided on the silicon substrate 10 as an aspect in which the optical elements 20 are provided directly on the second main surface 10D of the silicon substrate 10. For example, the optical elements 20 are surface-emitting semiconductor lasers. If paired reflecting mirrors that constitute a laser resonator are vertically provided with a light-emitting layer therebetween, one of the reflecting mirrors is buried in the surface or inner area of the silicon substrate 10, and a compound semiconductor material other than the silicon substrate 10, which includes the light-emitting layer and the other reflecting mirror, can be stuck on the second main surface of the silicon substrate 10 such that they are formed integrally as one component.

The light-emitting or light-receiving sections of the optical elements 20 are not placed directly on the optical axes of the optical fibers 11, but optical coupling structures such as diffraction gratings can be arranged as the optical elements on the extensions of the optical axes of the optical fibers 11 on the second main surface 10D of the silicon substrate 10 to guide light, via an optical waveguide or the like, to the light-emitting sections of the light-emitting elements or the light-receiving sections of the light-receiving elements arranged in different locations on the second main surface 10D of the silicon substrate 10. The light-emitting elements or light-receiving elements can also be provided outside and separately from the optical coupling module.

The blind vias 10A can be formed in such a manner that their inner walls are perpendicular to the first main surface 10C; however, as shown in FIG. 2A, the blind vias 10A can be tapered in such a manner that their diameters become small gradually toward their depth direction from the first main surface 10C. The blind vias 10A can also be formed to have a compound shape of both the perpendicular shape and the tapered shape. Furthermore, the optical elements 20 include electrodes if they are light-emitting elements or light-receiving elements, and a resin layer 14 can be formed on the optical elements, and the electrodes of the optical elements 20 can electrically be connected to different portions of the second main surface using metal wiring lines on the resin layer 14.

FIG. 2B is a cross-sectional view of the blind vias in the optical coupling module shown in FIG. 1B. As shown in FIG. 2B, the optical coupling module is so configured that the optical fibers 11 are inserted into the blind vias 10A of the optical device shown in FIG. 2A. The optical fibers 11 are inserted into the blind vias 10A and fixed to the silicon substrate 10 by the transparent resin 12 or the like. Accordingly, the optical fibers 11 are optically coupled to the optical elements 20 on the second main surface 10D.

The optical coupling module with the configuration shown in FIG. 2B performs the following operations.

Light emitted from each optical element 20 is transmitted through the silicon substrate between the optical element 20 and the bottom of the corresponding blind via 10A and is incident upon one end of the corresponding optical fiber 11. The light incident upon the one end of the optical fiber 11 propagates through the optical fiber 11 and is incident upon a light-receiving element (not shown) disposed at the other end of the optical fiber 11.

Light emitted from each optical fiber 11 is transmitted through the silicon substrate between the bottom of the corresponding blind via 10A and the corresponding optical element 20 and is incident upon the optical element 20. The light incident upon the optical element 20 is photoelectrically converted into an electrical signal by the optical element 20.

FIG. 3 shows an example of the optical coupling module in which a light-emitting element 20A and a light-receiving element 20B are paired as the optical elements 20 shown in FIGS. 2A and 2B and their light-emitting and light-receiving sections are integrated into one module. As the light-emitting element 20A, for example, a surface-emitting semiconductor laser can be used. As the light-receiving element 20B, for example, a pin photodiode and a metal-semiconductor-metal (MSM) photodiode can be used. Hereinafter, two optical fibers will be referred to as optical fibers 11_1 and 11_2 and an optical fiber 11 when mentioned in this way indicates each of the optical fibers 11_1 and 11_2.

As shown in FIG. 3, the light-emitting element 20A and light-receiving element 20B are provided on the second main surface 10D of the silicon substrate 10. The light-emitting element 20A is placed on the optical axis of the optical fiber 11_1 and the light-emitting element 20B is placed on the optical axis of the optical fiber 11_2. Furthermore, a resin layer 14 is formed on the light-emitting element 20A, the light-receiving element 20B and the second main surface.

[1-1-2] Configuration Example (2) of Optical Coupling Module

Hereinafter, a configuration that differs mainly from the configuration of the optical coupling module shown in FIG. 3 will be described. This configuration example (2) is an example where the light-emitting element 20A or light-receiving element 20B is not placed directly on the optical axis of the corresponding optical fiber 11.

FIG. 4 is a cross-sectional view of the blind vias in the configuration example (2) of the optical coupling module shown in FIG. 1B. As shown in FIG. 4, an optical waveguide 15 is disposed on the second main surface 10D of the silicon substrate 10, and diffraction gratings (or reflecting mirrors) 22_1 and 22_2 are disposed on the optical waveguide 15 as optical elements on the optical axes of the optical fibers 11. Furthermore, the light-emitting element 20A and light-receiving element 20B are disposed on the optical waveguide 15 but outside the optical axes of the optical fibers 11_1 and 11_2.

The diffraction grating 22_1 diffracts light emitted from the light-emitting element 20A and bends the light to the optical fiber 11_1. The diffraction grating 22_2 diffracts light emitted from the optical fiber 11_2 and bends the light to the light-receiving element. The optical waveguide 15 transmits the light emitted from the light-emitting element 20A to the diffraction grating 22_1. The optical waveguide 15 also transmits the light diffracted by the diffraction grating 22_2 to the light-receiving element 20B. A resin layer 14 is formed on the light-emitting element 20A, the light-receiving element 20B and the optical waveguide 15.

The optical coupling module with the configuration shown in FIG. 4 performs the following operations.

Light emitted from the light-emitting element 20A is incident upon the diffraction grating 22_1 through the optical waveguide 15. The light incident upon the diffraction grating 22_1 is diffracted by the diffraction grating 22_1, transmitted through the silicon substrate between the second main surface 10D and the bottom of the blind via 10A and is incident upon one end of the optical fiber 11_1. The light incident upon the one end of the optical fiber 11_1 propagates through the optical fiber 11_1 and is incident upon a light-receiving element (not shown) provided at the other end of the optical fiber 11_1.

Light emitted from the optical fiber 11_2 is transmitted through the silicon substrate between the bottom of the blind via 10A and the optical waveguide 15 and is incident upon the diffraction grating 22_2. The light incident upon the diffraction grating 22_2 is diffracted by the diffraction grating 22_2 and is incident upon the light-receiving element 20B through the optical waveguide 15. The light incident upon the light-receiving element 20B is photoelectrically converted into an electrical signal by the light-receiving element 20B.

[1-1-3] Configuration Example (3) of Optical Coupling Module

The configuration example (3) is an example where a light modulator is placed between the light-emitting element 20A and the diffraction grating 22_1 in the configuration shown in FIG. 3.

FIG. 5 is a cross-sectional view of the blind vias in the configuration example (3) of the optical coupling module shown in FIG. 1B. As shown in FIG. 5, a light modulator 16 is placed between the light-emitting element 20A and the diffraction grating (or reflecting mirror) 22_1. The light modulator 16 modulates the wavelength of light emitted from the light-emitting element 20A and emits the wavelength-modulated light to the optical waveguide 15.

The optical coupling module with the configuration shown in FIG. 5 performs the following operations.

Light emitted from the light-emitting element 20A is incident upon the light modulator 16 through the optical waveguide 15. The wavelength of the light incident upon the light modulator 16 is modulated by the light modulator 16, and the wavelength-modulated light is incident upon the diffraction grating 22-1 through the optical waveguide 15. The light incident upon the diffraction grating 22_1 is diffracted by the diffraction grating 22_1, transmitted through the silicon substrate and is incident upon one end of the optical fiber 11_1.

[1-1-4] Configuration Example (4) of Optical Coupling Module

The configuration example (4) is an example where a ball lens is placed between one end of an optical fiber and the bottom of a blind via in the configuration shown in FIG. 3.

FIG. 6 is a cross-sectional view of the blind vias in the configuration example (4) of the optical coupling module shown in FIG. 1B. As shown in FIG. 6, a ball lens 30 is placed between one end of each of the optical fibers 11_1 and 11_2 and the bottom of the corresponding blind via 10A. The space between the ball lens 30 and the bottom of the blind via 10A can be filled with resin 12 and may contain air. The ball lens 30 is made of silicon, glass or the like.

The optical coupling module with the configuration shown in FIG. 6 performs the following operations.

Light emitted from the light-emitting element 20A is transmitted through the silicon substrate between the second main surface 10D and the bottom of the blind via 10A and is incident upon one end of the optical fiber 11_1 through the ball lens 30.

Light emitted from the optical fiber 11_2 is transmitted through the ball lens 30, transmitted through the silicon substrate between the bottom of the blind via 10A and the second main surface 10D, and is incident upon the light-receiving element 20B.

[1-1-5] Configuration Example (5) of Optical Coupling Module

The configuration example (5) is an example where a coaxial lens is placed between one end of an optical fiber and the bottom of a blind via in the configuration shown in FIG. 3.

FIG. 7 is a cross-sectional view of the blind vias in the configuration example (5) of the optical coupling module shown in FIG. 1B. As shown in FIG. 7, a coaxial lens (e.g. a coaxial refractive-index modulation rod lens) 31 is placed between one end of each of the optical fibers 11_1 and 11_2 and the bottom of the corresponding blind via 10A. The coaxial lens 31 can be made of silicon, glass or the like.

The optical coupling module with the configuration shown in FIG. 7 performs the following operations.

Light emitted from the light-emitting element 20A is transmitted through the silicon substrate between the second main surface 10D and the bottom of the blind via 10A and is incident upon one end of the optical fiber 11_1 through the coaxial lens 31.

Light emitted from the optical fiber 11_2 is transmitted through the coaxial lens 31, transmitted through the silicon substrate between the bottom of the blind via 10A and the second main surface 10D, and is incident upon the light-receiving element 20B.

[1-1-6] Configuration Example (6) of Optical Coupling Module

The configuration example (6) is an example where a diffraction optical element (e.g. a diffraction lens and a Fresnel lens) is formed and placed on the bottom of each of the blind vias 10A in the configuration shown in FIG. 3.

Figure 8:
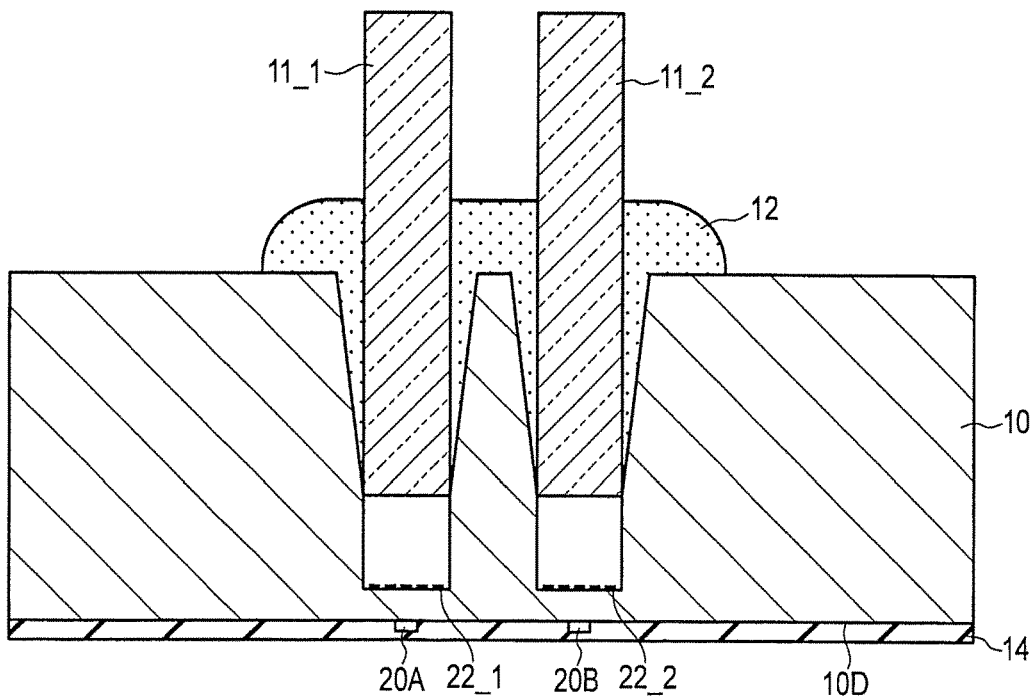
FIG. 8 is a cross-sectional view showing a configuration (6) of an optical coupling module according to the first embodiment.

FIG. 8 is a cross-sectional view of the blind vias in the configuration example (6) of the optical coupling module shown in FIG. 1B. As shown in FIG. 8, diffraction gratings 22_1 and 22_2 are arranged on the bottoms of the blind vias 10A, respectively. Air having a function of a lens is present between one end of each of the optical fibers 11_1 and 11_2 and the bottom of the corresponding blind via 10A.

The optical coupling module with the configuration shown in FIG. 8 performs the following operations.

Light emitted from the light-emitting element 20A is transmitted through the silicon substrate between the second main surface 10D and the bottom of the blind via 10A, diffracted by the diffraction grating 22_1 and is incident upon one end of the optical fiber 11_1.

Light emitted from the optical fiber 11_2 is diffracted by the diffraction grating 22_2, transmitted through the silicon substrate between the bottom of the blind via 10A and the second main surface 10D, and is incident upon the light-receiving element 20B.

[1-1-7] Configuration Example (7) of Optical Coupling Module

The configuration example (7) is an example where the bottom of each of the blind vias 10A has a concave shape in the configuration shown in FIG. 3.

FIG. 9 is a cross-sectional view of the blind vias in the configuration example (7) of the optical coupling module shown in FIG. 1B. As shown in FIG. 9, each of the blind vias 10A has a concave bottom 10E.

The optical coupling module with the configuration shown in FIG. 9 performs the following operations.

Light emitted from the light-emitting element 20A is transmitted through the silicon substrate between the second main surface 10D and the bottom of the blind via 10A and then through the concave bottom 10E and is incident upon one end of the optical fiber 11_1.

Light emitted from the optical fiber 11_2 is transmitted through the concave bottom 10E of the blind via 10A and then through the silicon substrate between the bottom of the blind via 10A and the second main surface 10D, and is incident upon the light-receiving element 20B.

[1-1-8] Configuration Example (8) of Optical Coupling Module

The configuration example (8) is an example where each of the blind vias 10A has a pin-shaped bottom in the configuration shown in FIG. 3.

FIG. 10 is a cross-sectional view of the blind vias in the configuration example (8) of the optical coupling module shown in FIG. 1B. As shown in FIG. 10, each of the blind vias 10A has a pin-shaped bottom, e.g. a conic bottom 10F.

The optical coupling module with the configuration shown in FIG. 10 performs the following operations.

Light emitted from the light-emitting element 20A is transmitted through the silicon substrate between the second main surface 10D and the bottom of the blind via 10A and then through the conic bottom 10F, and is incident upon one end of the optical fiber 11_1.

Light emitted from the optical fiber 11_2 is transmitted through the conic bottom 10F of the blind via 10A and then through the silicon substrate between the bottom of the blind via 10A and the second main surface 10D, and is incident upon the light-receiving element 20B.

[1-1-9] Configuration Example (9) of Optical Coupling Module

The configuration example (9) is an example where a groove is formed between adjacent blind vias 10A in the configuration shown in FIG. 3.

FIGS. 11A and 11B are cross-sectional views of the blind vias in the configuration example (9) of the optical coupling module shown in FIG. 1B.

As shown in FIG. 11A, a groove 10G is formed between the blind vias 10A, or between the optical fibers 11_1 and 11_2 to extend from the second main surface 10D of the silicon substrate 10. In other words, the silicon substrate 10 has a groove 10G in its second main surface 10D between the optical fibers 11_1 and 11_2.

As shown in FIG. 11B, a groove 10H is formed between the blind vias 10A, or between the optical fibers 11_1 and 112 to extend from the first main surface 10C of the silicon substrate 10. In other words, the silicon substrate 10 has a groove 10H in its first main surface 10C between the optical fibers 11_1 and 11_2.

These grooves 10G and 10H have a function of shielding scattered light generated from one end of each of the optical fibers and the bottom of each of the blind vias.

Like the configuration shown in FIG. 3, the configurations shown in FIGS. 11A and 11B make it possible to transmit and receive light between the optical fiber 11_1 and the light-emitting element 20A and between the optical fiber 11_1 and the light-receiving element 20B and also to reduce scattered light generated from one end of each of the optical fibers and the bottom of each of the blind vias.

[1-1-10] Configuration Example (10) of Optical Coupling Module

The configuration example (10) is an example where a light absorbing resin is formed on the transparent resin for fixing the optical fibers in the configuration shown in FIG. 3.

FIGS. 12A and 12B are cross-sectional views of the blind vias in the configuration example (10) of the optical coupling module shown in FIG. 1B.

As shown in FIG. 12A, a light absorbing resin 16A is placed only on the first main surface 10C and around the blind vias 10A into which the optical fibers 11_1 and 11_2 are fixed. As shown in FIG. 12B, a light absorbing resin 16B is placed on the first main surface 10C and the side surface 10J of the silicon substrate 10 around the blind vias 10A.

These light absorbing resins 16A and 16B are opaque to the emission wavelength of the light-emitting element 20A and their surfaces or side surfaces absorb scattered light generated from the bottoms of the blind vias and the like.

This controls crosstalk (e.g. stray light) to the optical fibers or optical elements in other blind vias and, in other words, scattered light generated from, e.g. the bottoms of the blind vias is cut.

[1-1-11] Configuration Example (11) of Optical Coupling Module

Figure 13:
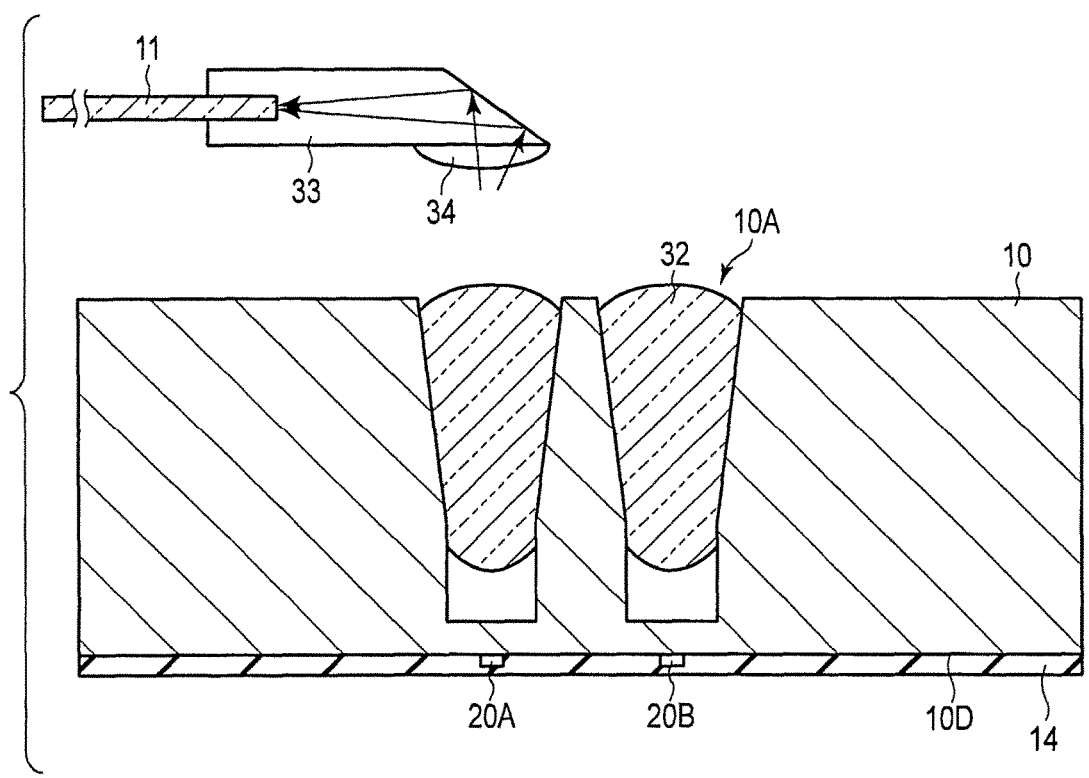
FIG. 13 is a cross-sectional view showing a configuration (11) of an optical coupling module according to the first embodiment.

FIG. 13 is a cross-sectional view of the blind vias in a modification to the optical coupling module. In this modification, a resin lens 32 is disposed in each of the blind vias 10A. A lens molding part (or a holder) 33 in which the optical fiber 11 is fixed is provided above the blind vias 10A. The lens molding part 33 includes a lens 34, and the lens 34 is placed on the optical axis of the resin lens 32 (and the light-emitting element 20A or the light-receiving element 20B). Furthermore, the light-emitting element 20A and the light-receiving element 20B are placed on their respective optical axes of the resin lenses 32 and on the second main surface of the silicon substrate 10. Light is transmitted and received between one of the light-emitting and light-receiving elements 20A and 20B and the optical fiber 11 through the resin lens 32 and the lens 34 of the lens molding part 33.

Other different configuration examples of the optical coupling module will be described below.

FIGS. 14, 15 and 16 are cross-sectional views of the blind vias in the optical coupling module shown in FIG. 1B.

As shown in FIG. 14, one end of each of the optical fibers 11_1 and 11_2 is formed spherically and, in other words, one end of each of the optical fibers 11_1 and 11_2 inserted into the blind vias 10A has a sphere shape. It is thus possible to improve optical coupling between the optical fibers and the light-emitting element 20A or the light-receiving element 20B. For example, when light is received from the light-emitting element 20A, reflected light fed back to the light-emitting element can be reduced.

As shown in FIG. 15, one end of each of the optical fibers 11_1 and 11_2 is formed obliquely and, in other words, one end of each of the optical fibers 11_1 and 11_2 inserted into the blind vias 10A has an oblique shape with respect to the first main surface 10C or the second main surface 10D. Thus, when light is received from the light-emitting element 20A, reflected light fed back to the light-emitting element can be controlled. For example, an externally induced noise due to the reflected feedback light, which causes a problem when the light-emitting element 20A is a semiconductor laser, can be controlled.

As shown in FIG. 16, one end of each of the optical fibers 11_1 and 11_2 has a surface parallel to the first main surface 10C (or the second main surface 10D), and the blind vias 10A are inclined relative to the first main surface 10C and, in other words, the depth direction of the blind vias 10A (the insertion direction of the optical fibers 11_1 and 11_2) is not perpendicular to the first main surface 10C but oblique. The "oblique" means that an angle between the first main surface 10C (or the second main surface 10D) and the depth direction of the blind vias 10A (or the optical fibers) is smaller than 90 degrees.

Thus, when light is received from the light-emitting element 20A, reflected light fed back to the light-emitting element can be controlled. For example, an externally induced noise due to the reflected feedback light, which causes a problem when the light-emitting element 20A is a semiconductor laser, can be controlled. The surface of one end of each optical fiber is not limited to the surface parallel to the first main surface but can be shaped spherically, obliquely or the like.

[1-1-12] Configuration Example of Openings of Blind Vias

FIG. 17 is plan views each showing the shape of an opening of each of the blind via 10A, viewed from above the blind via 10A.

The opening of the blind via 10A need not always have a shape that matches the circular section of the optical fiber 11, but may have the shape of an area that does not contact the side surface of the optical fiber 11, such as a square, a rhombus, an ellipse and a triangle as shown in (a) to (d) in FIG. 17

If, therefore, the opening of the blind via 10A has an area that does not contact the side surface of the optical fiber 11, a gap is formed to remove an excess transparent resin 12 and bubbles when the optical fiber 11 is inserted in the blind via 10A, thus making it easy to insert and assemble the optical fiber.

[1-2] Advantages of First Embodiment

According to the first embodiment, there can be provided an optical device and an optical coupling module which are capable of simplifying optical coupling between the optical fibers and the optical elements to decrease in size and costs.

Advantages of the first embodiment will be described in detail below.

In the first embodiment, the optical elements 20 are disposed on the second main surface 10D that is opposed to the first main surface 10C of the silicon substrate 10, the blind vias 10A are formed in the first main surface 10C of the silicon substrate 10, and the optical fibers 11 are inserted and fixed into their respective blind vias 10A. The optical fibers 11 (or the blind vias 10A) and the optical elements 20 are so aligned that the optical axes of the optical fibers 11 and those of the optical elements 20 coincide with each other. Accordingly, any holder for holding the optical fibers 11 need not be provided, but the optical fibers 11 and the optical elements 20 can be aligned with each other with high accuracy, with the result that the optical coupling between the optical fibers 11 and the optical elements 20 can be achieved by a simple and small configuration.

Since the blind vias 10A into which the optical fibers 11 are inserted do not penetrate the silicon substrate 10, the optical elements 20 can be formed on the undersides (second main surface) of the blind vias 10A. Thus, the silicon substrate 10 has a function of fixing the optical fibers 11 and fixing the optical elements 20 on the optical axes of the optical fibers 11.

Furthermore, the optical elements 20 that are made of a compound semiconductor are formed on the second main surface of the silicon substrate 10, or the optical elements 20 are formed directly on the second main surface of the silicon substrate 10, with the result that a large number of optical devices can be manufactured from a wafer, their quality control can be facilitated, and the manufacturing can be decreased in costs.

[2] Second Embodiment

The second embodiment will be described with respect to (1) an optical coupling module device in which an integrated circuit is formed integrally with the silicon substrate 10 of the optical coupling module according to the first embodiment, (2) an optical coupling module device in which the silicon substrate 10 is bonded to an integrated circuit chip, (3) an optical coupling module device in which the silicon substrate 10 is bonded to a redistribution layer, and (4) another optical coupling module device in which the silicon substrate 10 is bonded to a redistribution layer.

[2-1] Optical Coupling Module Device (1)

Figure 18A:
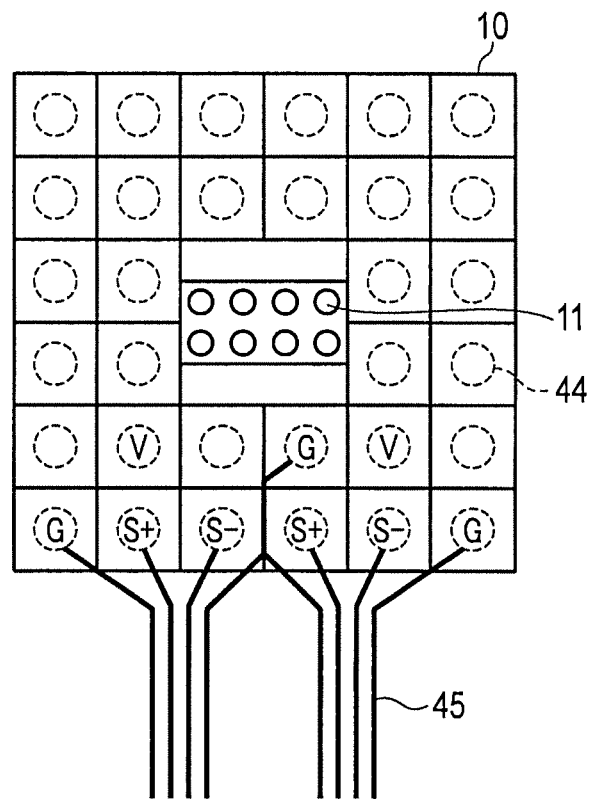
FIGS. 18A and 18B are illustrations of an optical coupling module device (1) according to a second embodiment.
Figure 18B:
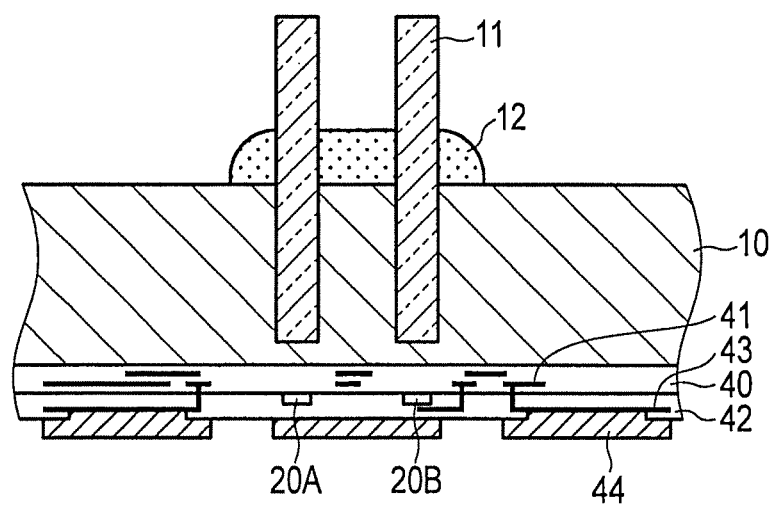

FIG. 18A is a plan view showing a configuration of an optical coupling module device (1) according to the second embodiment, and FIG. 18B is a cross-sectional view of the optical coupling module device (1). The cross-sectional view of FIG. 18B shows two optical fibers 11 and does not show any other optical fibers, any optical elements, or the like.

The optical fibers 11 are inserted into the blind vias 10A formed in the first main surface of the silicon substrate 10 and fixed by the transparent resin 12. A layer 40 in which an integrated circuit is formed is disposed on the second main surface of the silicon substrate 10. Wiring 41 is formed in the layer 40. A light-emitting element 20A and a light-receiving element 20B are arranged on the layer 40. The light-emitting element 20A and light-receiving element 20B are arranged on their respective optical axes of the optical fibers 11.

A resin layer 42 is formed on the light-emitting element 20A, light-receiving element 20B and layer 40, and wiring 43 is formed in the resin layer 42. Electrodes 44 are formed on the resin layer 42. The electrodes 44 are electrically connected to the integrated circuit, light-emitting element 20A and light-receiving element 20B through wiring 43 and wiring 41.

Furthermore, wiring 45 is connected to the electrode 44 from a wiring substrate (not shown). In FIG. 18A, S+ and S− each represent a differential signal voltage, V represents a power supply voltage, and G represents a ground voltage. The other configuration is the same as that of the first embodiment described above.

[2-2] Optical Coupling Module Device (2)

FIG. 19 is a cross-sectional view showing a configuration of the optical coupling module device (2) according to the second embodiment. A semiconductor substrate, e.g. a silicon substrate 60 is disposed on a wiring substrate 50. An optical coupling module is jointed to the silicon substrate 60 by, e.g. a solder ball 46.

The silicon substrate 60 includes a layer 61 in which an integrated circuit is formed. The integrated circuit is electrically connected to wiring (not shown) on the wiring substrate 50 by a bonding wire 62.

In the optical coupling module, the optical fibers 11 are fixed into the blind vias 10A of the silicon substrate 10 by the transparent resin 12. A light-emitting element 20A and a light-receiving element 20B are arranged on the second main surface of the silicon substrate 10. The light-emitting element 20A and light-receiving element 20B are arranged on their respective optical axes of the optical fibers 11.

A resin layer 42 is formed on the light-emitting element 20A, the light-receiving element 20B and the second main surface, and wiring 43 is formed in the resin layer 42. Electrodes 44 are formed on the resin layer 42 and electrically connected to solder balls 46. Thus, the integrated circuit formed on the silicon substrate 60 is electrically connected to the light-emitting element 20A and light-receiving element 20B through the solder balls 46, electrodes 44, wiring 43 and the like. The other configuration is the same as that of the first embodiment described above.

[2-3] Optical Coupling Module Device (3)

FIG. 20 is an illustration of a configuration of the optical coupling module device (3) according to the second embodiment. A redistribution layer 70 is bonded to the second main surface of the optical device (silicon substrate 10). Wiring 71 is formed in the redistribution layer 70. The redistribution layer 70 is formed to extend to a region outside the second main surface of the optical device. On the extended redistribution layer 70, an integrated circuit chip, e.g. a driver/receiver (D/R) 63 and a system-on-a-chip (SoC) 64 are placed. The side surfaces of the optical device are coated with resin 80. Solder balls 72 are formed on the redistribution layer 70.

In the optical device, an optical fiber 11 is fixed into the blind via 10A of the silicon substrate 10 by transparent resin 12. An optical element 20 is disposed on the second main surface of the silicon substrate 10. The optical element 20 is placed on the optical axis of the optical fiber 11.

The optical element 20, the driver/receiver (D/R) 63 and SoC 64 are electrically connected to the solder balls 72 by the wiring 71 provided in the redistribution layer 70. The other configuration is the same as that of the first embodiment described above.

[2-4] Optical Coupling Module Device (4)

FIG. 21 is an illustration of a configuration of the optical coupling module device (4) according to the second embodiment. A redistribution layer 70 is bonded to the second main surface of the optical device (silicon substrate 10). Electrodes 73 are formed in the redistribution layer 70 and connected to their corresponding wirings 71. The redistribution layer 70 is formed to extend to a region outside the second main surface of the optical device. An integrated circuit chip 90 is bonded to the surface opposed to the surface on which the optical device of the redistribution layer 70 is disposed. The integrated circuit chip 90 is located opposite to the optical device. The side surfaces of the optical device are coated with resin 80. Solder balls 72 are formed on the redistribution layer 70.

In the optical device, an optical fiber 11 is fixed into the blind via 10A of the silicon substrate 10 by transparent resin 12. An optical element 20 is disposed on the second main surface of the silicon substrate 10. The optical element 20 is placed on the optical axis of the optical fiber 11.

The optical element 20 and the integrated circuit chip 90 are electrically connected to the solder balls 72 by the wirings 71 and electrodes 73 provided in the redistribution layer 70. The other configuration is the same as that of the first embodiment described above.

[2-5] Advantages of the Second Embodiment

According to the second embodiment, an integrated circuit is formed integrally with the silicon substrate 10 of the optical coupling module, the silicon substrate 10 is bonded to an integrated circuit chip, and the silicon substrate 10 is bonded to a redistribution layer. It is thus possible to provide an optical coupling module device that is capable of decreasing in size, decreasing in costs and improving in performance. The other advantages are the same as those of the first embodiment.

[3] Modifications and the Like

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical device comprising:
   an optical element provided directly on a second main surface opposed to a first main surface of a semiconductor substrate;
   a via aligned with the optical element and formed to extend part way in a thickness direction from the first main surface of the semiconductor substrate; and
   a first wiring layer provided on the second main surface of the semiconductor substrate,
   wherein the optical element is made of a compound semiconductor, and the compound semiconductor is formed integrally with the second main surface of the semiconductor substrate,
   wherein the via has a region where inner walls on both sides of the via extend in a first direction parallel to the thickness direction from a bottom side of the via,
   and in a cross section of the via along a plane parallel to the first main surface, the via is other than circular.

2. The optical device according to claim 1, wherein the first wiring layer includes a wiring configured to transmit at least one of an electrical signal or an optical signal.

3. The optical device according to claim 1, further comprising:
   a resin layer provided at least one of on the second main surface or on a side surface of the semiconductor substrate, and
   a second wiring layer provided on the resin layer.

4. The optical device according to claim 1, wherein in a cross section of the via parallel to a direction orthogonal to the first main surface, directions of inner walls on both sides of the via extend in the first direction from the bottom side of the via and extend in directions to widen the interval between the inner walls on both sides in a middle of reaching the first main surface.

5. The optical device according to claim 1, wherein the semiconductor substrate includes a silicon substrate.

6. An optical coupling module comprising:
   a via formed to extend part way in a thickness direction from a first main surface of a semiconductor substrate;
   an optical fiber fixed into the via;
   an optical element placed on a second main surface opposed to the first main surface of the semiconductor substrate; and
   a first wiring layer provided on the second main surface of the semiconductor substrate,
   wherein the optical element is made of a compound semiconductor, and the compound semiconductor is formed integrally with the second main surface of the semiconductor substrate,
   wherein the via has a region where inner walls on both sides of the via extend in a first direction parallel to the thickness direction from a bottom side of the via,
   and in a cross section of the via along a plane parallel to the first main surface, the cross section of the via is different from a cross section of the optical fiber.

7. The optical coupling module according to claim 6, wherein the optical element includes the compound semiconductor provided directly on the second main surface of the semiconductor substrate.

8. The optical coupling module according to claim 6, wherein the optical element includes a crystal growth layer provided on the second main surface of the semiconductor substrate.

9. The optical coupling module according to claim 6, wherein the optical element is placed on an optical axis of the optical fiber.

10. The optical coupling module according to claim 6, further comprising:
    a diffraction grating serving as the optical element and placed on an optical axis of the optical fiber; and
    an optical waveguide which guides light diffracted by the diffraction grating to another optical element.

11. The optical coupling module according to claim 6, further comprising a ball lens disposed between an end of the optical fiber and a bottom of the via.

12. The optical coupling module according to claim 6, wherein the via has a convex bottom.

13. The optical coupling module according to claim 6, wherein the via has a conical bottom.

14. The optical coupling module according to claim 6, further comprising a plurality of vias including said via; and
    a groove formed between the vias to shield light from the optical fiber.

15. The optical coupling module according to claim 6, further comprising resin which covers at least part of the first main surface excluding the optical fiber and absorbs light scattered from one of the optical fiber and the optical element.

16. The optical coupling module according to claim 6, wherein the via is partly tapered in such a manner that a diameter of the via becomes small gradually toward a depth direction from the first main surface of the semiconductor substrate.

17. The optical coupling module according to claim 6, wherein the via has an opening including an area that does not contact a side surface of the optical fiber.

18. The optical coupling module according to claim 6, further comprising:
    a lens provided in the via.

19. The optical coupling module according to claim 6, wherein the first wiring layer includes a wiring configured to transmit at least one of an electrical signal or an optical signal.

20. The optical coupling module according to claim 6, further comprising:
a resin layer provided at least one of on the second main surface or on a side surface of the semiconductor substrate, and
a second wiring layer provided on the resin layer.

21. The optical coupling module according to claim 6, wherein a width of the compound semiconductor is narrower than a width of the optical fiber in a cross section crossing the via.

22. The optical coupling module according to claim 6, further comprising:
a second wiring layer provided to extend to a region outside the second main surface of the semiconductor substrate, the second wiring layer having a wiring.

23. The optical coupling module according to claim 22, further comprising an integrated circuit provided at a side of the semiconductor substrate.

24. The optical coupling module according to claim 22, further comprising an integrated circuit provided on a surface of the second wiring layer, which is opposite to a surface on which the semiconductor substrate is provided.

25. The optical coupling module according to claim 6, wherein in a cross section of the via parallel to a direction orthogonal to the first main surface, directions of inner walls on both sides of the via extend in the first direction from the bottom side of the via and extend in directions to widen the interval between the inner walls on both sides in a middle of reaching the first main surface.

26. The optical coupling module according to claim 6, wherein the semiconductor substrate includes a silicon substrate.

27. An optical coupling module comprising:
a via formed to extend part way in a thickness direction from a first main surface of a semiconductor substrate;
an optical fiber fixed into the via;
an optical element placed on a second main surface opposed to the first main surface of the semiconductor substrate; and
a first wiring layer provided on the second main surface of the semiconductor substrate,
wherein the optical element is made of a compound semiconductor, and a width of the compound semiconductor is narrower than a width of the optical fiber in a cross section crossing the via,
wherein the via has a region where inner walls on both sides of the via extend in a first direction parallel to the thickness direction from a bottom side of the via,
and in a cross section of the via along a plane parallel to the first main surface, the cross section of the via is different from a cross section of the optical fiber.

28. The optical coupling module according to claim 27, wherein the compound semiconductor includes a crystal growth layer on a compound semiconductor substrate other than the semiconductor substrate, and the compound semiconductor is stuck on the semiconductor substrate to form an optical element active section.

29. The optical coupling module according to claim 27, wherein in a cross section of the via parallel to a direction orthogonal to the first main surface, directions of inner walls on both sides of the via extend in the first direction from the bottom side of the via and extend in directions to widen the interval between the inner walls on both sides in a middle of reaching the first main surface.

30. The optical coupling module according to claim 27, wherein the semiconductor substrate includes a silicon substrate.

* * * * *